United States Patent [19]

Kamei et al.

[11] Patent Number: 4,563,317
[45] Date of Patent: Jan. 7, 1986

[54] PROCESS OF PRODUCING POROUS THERMOPLASTIC RESIN ARTICLE

[75] Inventors: Eiichi Kamei; Yasushi Shimomura, both of Hirakata, Japan

[73] Assignee: UBE Industries, Ltd., Ube, Japan

[21] Appl. No.: 686,654

[22] Filed: Dec. 27, 1984

[30] Foreign Application Priority Data

Dec. 28, 1983 [JP] Japan .................. 58-247312
Dec. 28, 1983 [JP] Japan .................. 58-247313
Oct. 4, 1984 [JP] Japan .................. 59-209181

[51] Int. Cl.$^4$ .................. B29C 55/02; B29C 55/22; B29C 35/16
[52] U.S. Cl. .................. 264/28; 264/83; 264/154; 264/289.6; 264/DIG. 47
[58] Field of Search .................. 264/28, 41, 83, 154, 264/DIG. 47, 209.3, 289.6, 288.8

[56] References Cited

U.S. PATENT DOCUMENTS

| | | | |
|---|---|---|---|
| 2,320,112 | 5/1943 | Wiley | 264/28 |
| 3,946,094 | 3/1976 | Kanetsuna | 264/28 |
| 4,384,023 | 5/1983 | Okamura et al. | 264/41 |

FOREIGN PATENT DOCUMENTS

| | | | |
|---|---|---|---|
| 66915 | 6/1974 | Japan | 264/28 |
| 191101 | 2/1967 | U.S.S.R. | 264/28 |

Primary Examiner—James Lowe
Attorney, Agent, or Firm—Frishauf, Holtz, Goodman & Woodward

[57] ABSTRACT

A process of producing a porous thermoplastic resin article in the form of hollow yarn or film which comprises a step for forming a large number of micropores in the article by drawing an article, which is characterized in that the drawing process is performed in a medium selected from the group consisting of nitrogen, oxygen, argon, carbon monoxide and a hydrocarbon such as methane or ethane at a temperature in the range of the freezing point to 50° C. above the boiling point of said medium.

19 Claims, No Drawings

PROCESS OF PRODUCING POROUS THERMOPLASTIC RESIN ARTICLE

BACKGROUND OF THE INVENTION

1. Field of the Invention

The present invention relates to a process for producing porous thermoplastic article in the form of hollow yarn or film.

2. Description of the Prior Arts

A porous hollow yarn made from a polymer material having the surrounding wall with a large number of micropores formed therein is used widely as a device for separating various substances. For example, in the clinical field, it is employable for separation of blood plasma and ultrafilteration.

As a process of producing a porous hollow yarn, there is known a process which comprises the steps of preparing a hollow yarn from a polymer material containing a soluble material dispersed therein and then removing said soluble material by dissolving it with an appropriate solvent to form a large number of micropores in the surrounding wall of said yarn. Recently, another process using a hollow yarn of a thermoplastic crystalline polymer material has been proposed and now is utilized in practice. By this process, said hollow yarn is heat-treated and then subjected to a drawing process to form pores in the surrounding wall. Thermoplastic polymers which can be used for the above purpose are polyolefin, polyamide, polyester and other analogous copolymers. Among those materials, polypropylene (homopolymer of propylene or copolymer of propylene and other monomers) is considered to be satisfactory as the polymer material for producing a porous hollow yarn because it is excellent in moldability, mechanical strength and resistance to chemicals.

Processes of producing a porous hollow yarn using polypropylene as the polymer material have been described in Japanese Patent Provisional Publications No. 52(1977)-15627, No. 52(1977)-137026, No. 53(1978)-38715, No. 54(1978)-34418, No. 54(1979)-68414, No. 54(1979)-120735, No. 54(1979)-138623, No. 55(1980)-1314, No. 55(1980)-5914, etc. Most of these processes disclosed in the above publications comprise the main procedure in which a polypropylene hollow yarn spinned is first heat-treated and then drawn in the vicinity of room temperature to form micropores so as to produce a porous body, and the resultant body is again heat-treated so as to have micropores fixed therein.

In view of the application purpose of a porous polypropylene hollow yarn, micropores formed in the surrounding wall are desired to be uniformly distributed at a density as desired (the density is expressed by the void ratio). The process to produce such a yarn of desired properties has been disclosed in Japanese Patent Provisional Publications No. 54(1979)-34418, No. 54(1979)-68414, 54(1979)-138623, etc. in which the degree of crystal orientation in a yarn is enhanced by heat treatment under specific conditions, and then the yarn is drawn to form micropores therein. Another process which improves the above process by eliminating such a complex treatment has been disclosed in Japanese Patent Provisional Publication No. 55(1980)-1314, in which the degree of crystal orientation in a yarn is enhanced by setting the conditions of spinning (which is done prior to the drawing process of a polypropylene hollow yarn) within specific ranges.

In the above-described conventional process, the step of enhancing the crystal orientation in a polypropylene hollow yarn is necessarily introduced before the drawing step in order to give the desired property to a porous polypropylene hollow yarn. Therefore, the manufacturing process as a whole still remains to be complicated.

Also known is a porous thermoplastic film having a large number of micropores formed therein. Such porous film is used widely, for instance, as a filtering or separating device for air cleaning or water treatment, a diaphragm for electric cell or electrolysis, or a separating membrane for artificial lung or blood plasma.

As a process of producing the porous thermoplastic film, there can be employed the essentially same process as described in the preparation of the porous hollow yarn.

Various thermoplastic, crystalline polymers employable for the above purpose are known. Particularly, polyolefin, fluorine-containing polymer, polyamide, polyester and other analogous copolymers are generally used. Among those materials, polypropylenes (homopolymer of propylenes or copolymers of propylene and other monomers) and fluorine-containing polymers are considered to be satisfactory as the polymer materials for producing a porous thermoplastic film because it is excellent in mechanical strength and resistance to chemicals.

Processes of producing a porous thermoplastic resin films have been described, for instance, in Japanese Patent Publication No. 46(1971)-40119, No. 50(1975)-2176, No. 55(1980)-32531, and No. 54(1979)-34418. Most of these processes disclosed in the above publications comprise the main procedure in which a thermoplastic resin film is first heat-treated and then drawn at the vicinity of room temperature or at a temperature of not lower than the second order transition point of the thermoplastic resin employed (e.g., not lower than −40° C. in the case that a polypropylene is employed as the resin) to form micropores producing a porous body, and the resultant body is again heat-treated so as to have micropores fixed therein.

In view of the application purpose of a porous thermoplastic resin film, micropores formed in the film are desired to be uniformly distributed at a density as desired (the density is also expressed by the void ratio). However, the porous thermoplastic film obtained in the above process has a relatively small average pore size such as not larger than 5,000 angstrom and low void ratio. For these reasons, the porous thermoplastic film obtained in the above process is not appropriate in the use for membrane for separation of blood plasma, etc., and the use of the porous film is thus under limitation.

It is known that a porous thermoplastic resin film having uniformly distributed, relatively large micropores and a high void ratio can be produced by the above-stated known method using a thermoplastic film having high orientation degree or high elastic recovery. Such thermoplastic films can be produced by forming the film under specific conditions, or by enhancing the crystal orientation degree through heat-treatment of the resin film. Thus, the known methods generally require a supplemental procedure for enhancing the crystal orientation degree of the resin film, if a porous thermoplastic resin film having high quality is desired. The process for producing a porous thermoplastic film in which the supplemental procedure is introduced is relatively more complicated as a whole.

SUMMARY OF THE INVENTION

The present inventors have studied to improve the above-described conventional manufacturing processes and found that an advantageous crazing phenomenon takes place when a thermoplastic resin article such as hollow yarn or film is drawn in the specific medium at an extremely low temperature, and the inventors also have found that this crazing phenomenon works out effectively for the formation of a well-acceptable porous article if the resin article has a low crystal orientation degree, i.e. the low draft ratio.

An object of the present invention is to provide a process of producing a porous thermoplastic resin article having uniformly distributed, relatively large micropores and a high void ratio.

A specific object of the invention is to provide a process of producing a porous polypropylene hollow yarn having uniformly distributed, relatively large micropores and a high void ratio on the surrounding wall.

Another specific object of the invention is to provide a process of producing a porous thermoplastic resin film having uniformly distributed, relatively large micropores and a high void ratio on the film body.

In one aspect, the present invention provides a process of producing a porous polypropylene hollow yarn which comprises a step for forming a large number of micropores in the surrounding wall of said yarn by drawing a polypropylene hollow yarn, which is characterized in that the drawing process is performed in a medium selected from the group consisting of nitrogen, oxygen, argon, carbon monoxide and a hydrocarbon at a temperature in the range of the freezing point to 50° C. above the boiling point of said medium.

In this process, pores can be formed in the specific medium at an extremely low temperature, and a porous polypropylene hollow yarn of a high void ratio with uniformly distributed pores formed therein can be produced even from polypropylene of a low draft ratio which is not employable to produce a porous hollow yarn of desirable properties in the conventional process. Therefore, the above-described process of the invention is free from the complicated process involved in the conventional process for the preparation of a porous polypropylene hollow yarn of high quality.

In another aspect, the present invention provides a process of producing a porous thermoplastic resin film which comprises a step for forming a large number of micropores in said film by drawing a thermoplastic resin film, which is characterized in that the drawing process is performed in a medium selected from the group consisting of nitrogen, oxygen, argon, carbon monoxide, methane and ethane at a temperature in the range of the freezing point to 50° C. above the boiling point of said medium under the condition that the temperature for the drawing is not higher than −70° C.

In this process, pores can be formed in the specific medium at an extremely low temperature, and a porous thermoplastic resin film of a high void ratio with uniformly distributed pores formed therein can be produced even from a thermoplastic resin film of a low draft ratio or a low elastic recovery which is not employable to produce a porous film of desirable properties in the conventional process. Therefore, the above-described process of the invention is free from the complicated process such as a process for enhancement of draft ratio involved in the conventional process for the preparation of a porous thermoplastic resin film of high quality.

DETAILED DESCRIPTION OF THE INVENTION

In the present invention, the conditions required for the formation of pores are entirely different from those required by the conventional processes. Accordingly, there is no specific limitation on the kind of the thermoplastic resin to be used, and homopolymers of propylene, block copolymers of propylene with other monomers or oligomers and random copolymers of propylene with other monomers or oligomer can be preferably used (in the invention, the term of polypropylene is used to include all of the above-mentioned polymers, unless otherwise specified). There is no specific limitation on the above-mentioned monomer and oligomers, as far as these are copolymerizable with propylene. Examples include ethylene or oligomers derived from ethylene. Also employable are other thermoplastic resins such as other polyolefin (e.g., high density polyethylene and poly(4-methylpeneten-1), fluorine-containing polymers (e.g., poly(vinylidene fluoride) and ethylene-tetrafluoroethylene copolymer). The thermoplastic resin can be employed singly or in combination.

There is no specific limitation on the melt flow index (MFI) of the thermoplastic resin, but the consideration of efficiency and workability of the molding process suggests that MFI be about 0.5 to 40 g/10 min, more preferably 1 to 40 g/10 min.

In addition, the thermoplastic resins containing additives such as a plasticizer, dye, pigment, filler and fire-retardant can also be used.

In the first place, the present invention is stated with reference to the process of producing a porous polypropylene hollow yarn.

In the present process, a polypropylene resin is first spinned according to the conventional procedure of manufacturing a hollow yarn, so as to obtain a hollow yarn (not yet drawn). Appropriate conditions for spinning can be selected from known conditions. For example, the spinning temperature is above the temperature at which the polypropylene can be spinned and below the temperature at which polypropylene becomes thermally decomposed, while the temperature normally applied to is from 170° C. to 300° C. and more preferably from 190° C. to 270° C. There is no specific limitation on the draft ratio (the ratio of collecting rate of yarn to discharging rate from the nozzle: collecting rate/discharging rate) which indicates the degree of crystal orientation. However, in the case where the draft ratio is zero or nearly zero (i.e., the case where crystals are not or almost not oriented), it is rather difficult to provide a porous polypropylene hollow yarn with the desirable properties, even though the drawing process under the extremely low temperature of the present invention is applied. Therefore, in consideration of the properties of a porous polypropylene hollow yarn produced, such as void ratio, average diameter size of micropores; and also in consideration of workability for manufacturing, the draft ratio of the polypropylene hollow yarn to be employed in the present invention is preferably in the range of 10 to 6000.

A polypropylene hollow yarn can be heat-treated prior to the drawing. This heat treatment enhances the content of crystal structure in the polypropylene hollow yarn, and accordingly the property of a porous polypropylene hollow yarn produced from thus heat-treated yarn upon the drawing can be further improved.

The above-described heat treatment is performed, for example, by a process in which a polypropylene hollow yarn (not having been subjected to the drawing process) is heated in a hot air heated to a temperature in the range of 100° C. to 155° C. for not shorter than 3 seconds.

The drawing process of the invention is performed in the medium selected from nitrogen, oxygen, argon, carbon monoxide and a hydrocarbon at a temperature in the range of from the freezing point of said medium to 50° C. above the boiling point of said medium.

The drawing process of the present invention can employ the medium either singly or in combination.

Preferred range of the temperature for the drawing process employing the above-mentioned media are as follows; $-209°$ C. to $-146°$ C. in the case of nitrogen, $-218°$ C. to $-132°$ C. in the case of oxygen, $-189°$ C. to $-140°$ C. in the case of argon, $-205°$ C. to $-141°$ C. in the case of carbon monoxide, $-182°$ C. to $-140°$ C. in the case where methane is used as a hydrocarbon, and $-183°$ C. to $-70°$ C. in the case where ethane is used as a hydrocarbon. The present drawing process is preferably performed at a temperature of not higher than $-70°$ C., (more preferably not higher than $-100°$ C.).

At such a low temperature as in the range specified, said medium is in the state of either liquid, mixture of liquid and gas, or gas, and the drawing process of the invention can be performed in any of said states.

In the invention the crazing phenomenon takes place in the yarn, because the hollow yarn is stretched when it is drawn in said medium at the extremely low temperature. In contrast, the crazing phenomenon does not take place in other medium normally used in the conventional processes, and the hollow yarn shall become vitreous and fractured when it is drawn at a relatively high temperature.

The drawing process of the invention can be performed at a temperature in the range of the freezing point of the medium employed to 50° C. above the boiling point of the medium; however, from the viewpoints of manufacturing control and keeping constant properties of a resulting porous polypropylene hollow yarn, it is preferred to perform the drawing around the boiling point of the medium.

The draw ratio for drawing a hollow yarn at the extremely low temperature is generally in the range of 1 to 200% based on a polypropylene hollow yarn before being subjected to the drawing. Preferred range is 10 to 150%. In these draw ratio ranges, the number of pores formed tends to increase proportionally to the draw ratio, and this tendency can be utilized to adjust the number of pores and the void ratio as desired.

The drawing process at the extremely low temperature of the invention can be performed repeatedly at least twice until the desired average pore diameter and void ratio are obtained.

The formation of porous structure in the polypropylene hollow yarn in the drawing process using the specific medium at the extremely low temperature according to the present invention can work even on a polypropylene hollow yarn having a low crystal orientation degree to give a porous polypropylene hollow yarn of high quality having uniform pore diameter and high void ratio. It is pointed out that the conventional drawing process performed at around room temperature cannot effectively work on the polypropylene hollow yarn having a low crystal orientation degree.

The polypropylene hollow yarn drawn in said specific medium at the extremely low temperature is preferably subjected to an ordinary drawing process at an elevated temperature (hereinafter referred to as heat-drawing process). This heat-drawing process is done to enlarge the micropores of the hollow yarn produced in the drawing process at the extremely low temperature (hereinafter referred to as low-temperature drawing process). The heat-drawing can be performed, for example, by drawing in an air heated at 80° C. to 160° C., preferably 110° C. to 155° C. If the heating temperature exceeds 160° C., the formed micropores may sometimes be closed. If the heating temperature is below 80° C., the micropores are not sufficiently enlarged.

The draw ratio employed in the heat-drawing process is generally in the range of 10 to 700%, preferably 50 to 550%, more preferably 50 to 250%, based on the polypropylene hollow yarn after having been subjected to the drawing. If the draw ratio is less than 10%, the enlargement is not sufficient. If the draw ratio exceeds 700%, the yarn is apt to be broken.

Said heat-drawing process can be performed alternately with the low-temperature drawing process, or performed at least once after completion of at least one low-temperature drawing process.

The polypropylene hollow yarn drawn in said low-temperature drawing process and optionally drawn in said heat-drawing process is preferably subjected to a heat treatment for fixing micropores of the hollow yarn. The heat treatment can be performed, for example, by placing the polypropylene hollow yarn having micropores formed therein and being under the drawing conditions, for at least 3 seconds in an air heated at 110° C. to 150° C., preferably 130° to 155° C. If the heating temperature exceeds 155° C., the formed micropores may sometimes be closed. If the heating temperature is below 110° C. or if the yarn is kept in the air less than 3 seconds, the micropores are not sufficiently fixed so that the micropores may be closed later, and the sizes of the micropores are apt to be readily reduced with temperature variations in the practical uses. The low-temperature drawing process and the heat treatment can be performed repeatedly until the desired average pore diameter and void ratio are obtained. In order to repeat the drawing process, the temperature of the hollow yarn is once returned to room temperature, and then the process including the drawing at the extremely low temperature and the heat treatment can be applied repeatedly to the yarn.

The porous polypropylene hollow yarn produced through the combination of the low-temperature drawing process and the heat-drawing process is particularly appropriate for the use in a module for separation of blood plasma from a blood, because hemolysis caused by breakage of red blood corpuscle difficulty takes place. For this reason, the blood plasma-separation process using said porous polypropylene hollow yarn can be performed at a transmission membrane pressure (i.e., TMP) higher than the conventionally employed TMP, whereby prominently shortening the filtration period. The reason why the porous polypropylene hollow yarn produced as above is relatively free from the hemolysis is not known. However, it is presumed that the inside walls of the pores produced in the yarn have little protruding portions (which are assumed to cause the hemolysis).

The above-described process can be applied to the preparation of a porous thermoplastic resin film without substantial change. However, it is pointed out that the process of the invention for the preparation of a porous thermoplastic resin film of high quality is advantageous in that a thermoplastic resin film having low elastic recovery can be employed. Naturally, a thermoplastic resin film having a high elastic recovery such as more than 20% (value given in the test after stretching the length as much as 50% at 25° C.and RH 68%) is advantageously used in the process of the invention. Preferably, the elastic recovery ranges from 30 to 95%, from the viewpoint of workability in the use of an ordinary-type molding machine.

The elastic recovery (%) is expressed by [length of stretched film—length of film recovered after having been subjected to the streching]/[length of stretched film—length of film before being subjected to the streching]×100.

The thermoplastic resin film employed as the starting material can be any film prepared in known processes.

The working examples of the present invention and comparison examples are given below.

EXAMPLE 1

Polypropylene (UBE-PP-J130G, trade name, available from Ube Industries, Ltd., MFI=30 g/10 min) was spinned using a nozzle made for producing hollow yarns, which was equipped with a gas supplier tube of the diameter of 8 mm and inner diameter of 7 mm under the conditions of the spinning temperature at 210° C., collecting rate of 200 m/min, and draft ratio of 726. The obtained polypropylene hollow yarn was heat-treated for 30 minutes in an air bath heated to 145° C., and then the yarn was drawn in liquid nitrogen at −195° C. to give a length of 20% longer than the initial length. Subsequently, the drawn yarn was placed under the tension in the air bath heated to 145° C. for 15 minutes to obtain a porous polypropylene hollow yarn.

The outer diameter of the porous polypropylene hollow yarn obtained was 200 μm, and the inner diameter was 150 μm. The average pore diameter and void ratio measured by the mercury injection process (measurements were performed using POROSIMETRO SERIES 1500 produced by CARLOERBA Corp., Italy) were 0.1 μm and 3.1%, respectively.

The surrounding wall of the above porous polypropylene hollow yarn was observed by an electron microscope, and it was found that throughout the wall a large number of pores of approximately constant diameter were uniformly formed.

COMPARISON EXAMPLE 1

The procedure of Example 1 was repeated except that the drawing temperature was changed to room temperature, and the drawing atmosphere was replaced with air, to produce a porous polypropylene hollow yarn.

The outer diameter and inner diameter of the porous polypropylene hollow yarn obtained were 198 μm and 148 μm, respectively. The average pore diameter was 0.01 μm, and the void ratio was 2.5%.

EXAMPLE 2

The procedure of Example 1 was repeated except that the draw ratio was changed to 20%, and the drawing atmosphere was replaced with liquid methane (−160° C.), to produce a porous polypropylene hollow yarn.

The outer diameter and inner diameter of the porous polypropylene hollow yarn obtained were 198 μm and 149 μm, respectively. The average pore diameter was 0.03 μm, and the void ratio was 3%.

The surrounding wall of the above porous polypropylene hollow yarn was observed by an electron microscope, and it was found that throughout the wall a large number of pores of approximately constant diameter were uniformly formed.

EXAMPLE 3

The procedure of Example 1 was repeated except that no heat treatment was applied to the polypropylene hollow yarn prior to being subjected to the drawing, to produce a porous polypropylene hollow yarn.

The average pore diameter was 0.1 μm, and the void ratio was 2.8%.

The surrounding wall of the above porous polypropylene hollow yarn was observed by an electron microscope, and it was found that throughout the wall a large number of pores of approximately constant diameter were uniformly formed.

COMPARISON EXAMPLE 2

The procedure of Example 3 was repeated except that the drawing temperature was changed to room temperature, and the drawing atmosphere was replaced with air, to produce a porous polypropylene hollow yarn.

The surrounding wall of the above porous polypropylene hollow yarn was observed by an electric microscope, and pores were scarecely found in the wall.

EXAMPLE 4

The procedure of Example 1 was repeated except that the collecting rate was changed to 50 m/min, and the draft ratio was changed to 27, to produce a porous polypropylene hollow yarn.

The average pore diameter was 0.1 μm, and the void ratio was 2.3%.

The surrounding wall of the above porous polypropylene hollow yarn was observed by an electron microscope, and it was found that throughout the wall a large number of pores of approximately constant diameter were uniformly formed.

COMPARISON EXAMPLE 3

The procedure of Example 4 was repeated except that the drawing temperature was changed to room temperature, and the drawing atmosphere was replaced with air, to produce a porous polypropylene hollow yarn.

The surrounding wall of the above porous polypropylene hollow yarn was observed by an electric microscope, and pores were scarecely found in the wall.

EXAMPLE 5

The procedure of Example 1 was repeated except that the polypropylene was replaced with a block copolymer of propylene (UBE-PP-709K, trade name, available from Ube Industries, Ltd., MFI=9 g/10 min), to produce a porous polypropylene hollow yarn.

The outer diameter and inner diameter of the porous polypropylene hollow yarn obtained were 199 μm and 150 μm, respectively. The average pore diameter was 0.1 μm, and the void ratio was 3.0%.

The surrounding wall of the above porous polypropylene hollow yarn was observed by an electron microscope, and it was found that throughout the wall a large number of pores of approximately constant diameter were uniormly formed.

EXAMPLE 6

The procedure of Example 1 was repeated except that the polypropylene was replaced with a random copolymer of propylene (UBE-PP-S309K, trade name, available from Ube Industries, Ltd., MFI=9 g/10 min), to produce a porous polypropylene hollow yarn.

The average pore diameter was 0.08 μm, and the void ratio was 3.0%.

The surrounding wall of the above porous polypropylene hollow yarn was observed by an electron microscope, and it was found that throughout the wall a large number of pores of approximately constant diameter were uniformly formed.

EXAMPLE 7

The procedure of Example 1 was repeated except that the polypropylene was replaced with a polypropylene of MFI=9 g/10 min (UBE-PP-J109G, trade name, available from Ube Industries, Ltd.), to produce a porous polypropylene hollow yarn.

The average pore diameter was 0.09 μm, and the void ratio was 5.2%.

The surrounding wall of the above porous polypropylene hollow yarn was observed by an electron microscope, and it was found that throughout the wall a large number of pores of approximately constant diameter were uniformly formed.

EXAMPLE 8

Polypropylene (UBE-PP-F109K, trade name, available fom Ube Industries, Ltd., MFI=9 g/10min) was spun using a nozzle made for producing hollow yarns, which was equipped with a gas supplier tube of the diameter of 30 mm and inner diameter of 25 mm under the conditions of the spinning temperature at 210° C., collecting rate of 116 m/min, and draft ratio of 3790. The obtained polypropylene hollow yarn was heat-treated for 30 minutes in an air bath heated to 145° C., and then the yarn was drawn in liquid argon at −180° C. to give a length of 20% longer than the initial length. Subsequently, the drawn yarn was placed under the tension in the air bath heated to 145° C. for 15 minutes to obtain a porous polypropylene hollow yarn.

The average pore diameter was 0.08 μm, and the void ratio was 5.8%.

The surrounding wall of the above porous polypropylene hollow yarn was observed by an electron microscope, and it was found that throughout the wall a large number of pores of approximately constant diameter were uniformly formed.

EXAMPLE 9

The procedure of Example 8 was repeated except that the draw ratio was changed to 40%, and the drawing atmosphere was replaced with carbon monoxide under mixed gaseous-liquid condition (−141° C.), to produce a porous polypropylene hollow yarn.

The average pore diameter was 0.08 μm, and the void ratio was 8.8%.

The surrounding wall of the above porous polypropylene hollow yarn was observed by an electron microscope, and it was found that throughout the wall a large number of pores of approximately constant diameter were uniformly formed.

EXAMPLE 10

The procedure of Example 9 was repeated except that the polypropylene (UBE-PP-J109G, trade name, available from Ube Industries, Ltd., MFI=9 g/10 min) was spun using a nozzle made for producing hollow yarns, which was equipped with a gas supplier tube of the diameter of 8 mm and inner diameter of 7 mm under the conditions of the spinning temperature at 210° C., collecting rate of 200 m/min, and draft ratio of 726, and that the yarn was drawn in liquid oxygen at −132° C. at a draw ratio of 40 a length of 20% longer than the initial length.

The average pore diameter was 0.07 μm, and the void ratio was 6.3%.

The surrounding wall of the above porous polypropylene hollow yarn was observed by an electron microscope, and it was found that throughout the wall a large number of pores of approximately constant diameter were uniformly formed.

EXAMPLE 11

A polypropylene hollow yarn spun in the same manner as in Example 1 was heated for 30 minutes in the air bath heated to 145° C. Subsequently, the yarn was drawn in liquid nitrogen at −195° C. to a length of 20% longer than the initial length, and successively heat-treated under the tension for 15 minutes in the air bath heated to 145° C.

The average pore diameter was 0.1 μm, and the void ratio was 3.1%.

The obtained porous propylene hollow yarn was again drawn in the liquid nitrogen at a draw ratio of 20% and successively heat-treated under the tension for 15 minutes in the air bath heated to 145° C. The combination of the drawing process in the liquid nitrogen and the heat treatment was repeated twice as a whole. The average pore diameter was 0.16 μm, and the void ratio was 28%.

The surrounding wall of the above porous polypropylene hollow yarn was observed by an electron microscope, and it was found that throughout the wall a large number of pores of approximately constant diameter were uniformly formed.

EXAMPLE 12

The procedure of Example 11 was repeated except that the drawing process in the liquid nitrogen was repeated as much as 18 times and the draw ratio for each drawing was changed to 10%, to produce a porous polypropylene hollow yarn.

The average pore diameter was 0.70 μm, and the void ratio was 64%.

The surrounding wall of the above porous polypropylene hollow yarn was observed by an electron microscope, and it was found that throughout the wall a large number of pores of approximately constant diameter were uniformly formed.

EXAMPLE 13

The procedure of Example 11 was repeated except that the drawing process in the liquid nitrogen was repeated as much as 4 times, the heat treatment between the drawing processes was replaced with a simple return to room temperature, and the draw ratio for each drawing was changed to 10%, to produce a porous polypropylene hollow yarn.

The average pore diameter was 0.10 μm, and the void ratio was 20.0%.

The surrounding wall of the above porous polypropylene hollow yarn was observed by an electron microscope, and it was found that throughout the wall a large number of pores of approximately constant diameter were uniformly formed.

EXAMPLE 14

Polypropylene (UBE-PP-J130G, trade name, available from Ube Industries, Ltd., MFI=30 g/10 min) was spun using a nozzle made for producing hollow yarns, which was equipped with a gas supplier tube of the diameter of 8 mm and inner diameter of 7 mm under the conditions of the spinning temperature at 210° C., collecting rate of 200 m/min, and draft ratio of 726. The obtained polypropylene hollow yarn was heat-treated for 30 minutes in an air bath heated to 145° C., and then the yarn was drawn in liquid nitrogen at −195° C. to give a length of 20% longer than the initial length.

Subsequently, the drawn yarn was further drawn at a draw ratio of 120% in air at 145° C. and then placed under the tension in the air bath heated to 145° C. for 15 minutes to obtain a porous polypropylene hollow yarn.

The average pore diameter and void ratio measured by the mercury injection process were 0.36 μm and 55.5%, respectively.

The surrounding wall of the above porous polypropylene hollow yarn was observed by an electron microscope, and it was found that throughout the wall a large number of pores of approximately constant diameter were uniformly formed.

EXAMPLE 15

Polypropylene (UBE-PP-F109K) was spinned using a nozzle made for producing hollow yarns, which was equipped with a gas supplier tube of the diameter of 30 mm and inner diameter of 25 mm under the conditions of the spinning temperature at 210° C., collecting rate of 116 m/min, and draft ratio of 3790.

The obtained polypropylene hollow yarn was heat-treated for 30 minutes in an air bath heated to 145° C., and then the yarn was drawn in liquid nitrogen at −195° C. to give a length of 10% longer than the initial length.

Subsequently, the drawn yarn was placed under the tension in the air bath heated to 145° C. for 15 minutes. Thus treated yarn was again drawn in the liquid nitrogen at a draw ratio of 10%, and then heat-treated in the same manner as above.

Subsequently, the yarn was drawn at a draw ratio of 120% in an air at 145° C. and subsequently placed under the tension in the air bath heated to 145° C. for 15 minutes to obtain a porous polypropylene hollow yarn.

The average pore diameter and void ratio were 0.6 μm and 53.1%, respectively.

The surrounding wall of the above porous polypropylene hollow yarn was observed by an electron microscope, and it was found that throughout the wall a large number of pores of approximately constant diameter were uniformly formed.

EXAMPLE 16

The procedure of Example 15 was repeated except that the drawing atmosphere of the low-temperature drawing process was replaced with liquid argon (−180° C.), to produce a porous polypropylene hollow yarn.

The average pore diameter was 0.38 μm, and the void ratio was 43%.

The surrounding wall of the above porous polypropylene hollow yarn was observed by an electron microscope, and it was found that throughout the wall a large number of pores of approximately constant diameter were uniformly formed.

EXAMPLE 17

The procedure of Example 15 was repeated except that the draw ratio was changed to 20%, and the drawing atmosphere of the low-temperature drawing process was replaced with liquid argon (−180° C.), to produce a porous polypropylene hollow yarn.

The average pore diameter was 0.30 μm, and the void ratio was 32%.

The surrounding wall of the above porous polypropylene hollow yarn was observed by an electron microscope, and it was found that throughout the wall a large number of pores of approximately constant diameter were uniformly formed.

EXAMPLE 18

The procedure of Example 17 was repeated except that the polypropylene (UBE-PP-J109G) was spun using a nozzle made for producing hollow yarns, which was equipped with a gas supplier tube of the diameter of 8 mm and inner diameter of 7 mm under the conditions of the spinning temperature at 210° C., collecting rate of 200 m/min, and draft ratio of 726.

The average pore diameter was 0.15 μm, and the void ratio was 26%.

The surrounding wall of the above porous polypropylene hollow yarn was observed by an electron microscope, and it was found that throughout the wall a large number of pores of approximately constant diameter were uniformly formed.

REFERENCE EXAMPLE

TEST FOR EVALUATION OF POROUS POLYPROPYLENE HOLLOW YARN MODULE ON SEPARATION OF BLOOD PLASMA IN DOG BLOOD

Blood employed

A whole blood was collected from a grown mongrel dog (7 kg./body weight) by means of a blood-collecting bag, and the collected whole blood was employed after addition of sodium citrate and heparin (anti-coagulation agent).

Filtering module

A plurality of the porous polypropylene yarns produced in Example 14 (average wall thickness: 20 μm, average inner diameter: 400 μm, average pore diameter: 0.36 μm, void ratio: 55.5%, length: 20 cm) were bound all together to prepare a filtering module for separation of blood plasma. The filtering module was then washed by passing therethrough 200 ml. of physiological saline solution, 200 ml. of aqueous 75% ethanol, and again 200 ml. of physiological saline solution, successively, whereby the module was made hydrophilic.

Filtering procedure and evaluation of filtration ability

The physiological saline solution in the hydrophilically treated filtering module was once replaced with the blood for stabilization, and the whole blood was circulated through the module at TMP of 200 mmHg. The amount of albumin in the collected blood plasma was measured to give a filteration ratio [(amount of albumin in the collected blood plasma per unit/amount of albumin in the whole blood per unit)×100].

Results

The whole blood was able to circulate through all of the employed hollow yarns of the module. The filtration ratio (recovery ratio) of the albumin was 99% at 30 min. as well as 60 min. after the beginning of the circulation. In addition, globulin in the whole blood was also recovered in a high yield.

Further, it was noted that no hemolysis was observed in the above test, though the above test was performed at a transmission membrane pressure (TMP) of 200 mmHg which was higher than the ordinarily employed transmission pressure such as 10–70 mmHg.

EXAMPLE 19

Polypropylene (UBE-PP-J105G, trade name, available from Ube Industries, Ltd., MFI=5 g/10 min.) was moulded in an inflation moulding (blown-film extrusion) machine equipped with a blown-film die having a diameter of 50 mm and a slit gap of 0.7 mm to give a polypropylene film. The moulding operation was carried out in the following manner. The polypropylene was discharged at 210° C. with blowing an air into the valve at a blow ratio of 0.7, and thus produced film was cooled by blowing an air (at room temperature) onto the outer surface of the film at 5 cm on the dice. The cooled film was collected at 1.8 m on the dice by nip rolls at a collecting rate of 36 m/min.

The thickness of the obtained film (not yet drawn) was 10 μm, and showed an elastic recovery of 31% from 50% stretched condition.

The film was drawn in liquid nitrogen at −195° C. to give a length of 10% longer than the initial length. Subsequently, the drawn film was placed under the tension in the air bath heated to 145° C. for 10 minutes. for heat-fixing. After completion of the heat-fixing process, the film was further drawn in the liquid nitrogen to give a length of 10% longer than the length after the initial drawning process, and the drawn film was again placed under the tension in the air bath heated to 145° C. for 10 minutes, to produce a porous polypropylene film.

The average pore diameter and void ratio of the porous polypropylene film measured by the mercury injection process were 0.05 μm and 15.1%, respectively. The water transmission (permeation) rate was 2.30 l/m²·min·atom. The water transmission rate was measured according to an essentially same method as that defined in ASTM-F317. In more detail, the porous film was made hydrophilic by immersing it in an alcohol and an aqueous surfactant solution, and fixed on a certain holder. Water was placed on one surface of the film under pressure to pass through the film. The amount of water per unit time transmitted from one side to another side in the above-mentioned test was measured to give the water transmission rate.

The surface of the above porous polypropylene film was observed by a scanning electron microscope, and it was found that throughout the film surface a large number of pores of approximately constant diameter were uniformly formed. Further it was confirmed upon observation of the section of the film that almost all of the pores were continuously formed from one film surface to another film surface.

COMPARISON EXAMPLE 4

A polypropylene film (not yet drawn) was prepared in the same machine as in Example 19. The polypropylene employed and the moulding conditions were as follows.

Polypropylene: UBE-PP-Y105J, trade name, available from Ube Industries, Ltd., MFI=5 g/10 min.
Resin Discharging Temperature: 210° C.
Collecting Rate: 36 m/min.
Blow Ratio: 0.70

The thickness of the obtained film (not yet drawn) was 10 μm, and showed an elastic recovery of 31% from 50% stretched condition.

Subsequently, the film was drawn at room temperature (25° C.) in air in place of using the liquid nitrogen, and then treated in the same manner as in Example 19 to perform the heat-fixing procedure.

The surface of the obtained polypropylene film was observed by the scanning electron microscope, and no pores were found on the surface. Further it was confirmed upon observation of the section of the film that no pores were formed in the film.

EXAMPLE 20

A polypropylene film (not yet drawn) was prepared in the same machine as in Example 19. The polypropylene employed and the moulding conditions were as follows.

Polypropylene: UBE-PP-Y101J, trade name, available from Ube Industries, Ltd., MFI=1 g/10 min.
Resin Discharging Temperature: 230° C.
Collecting Rate: 20 m/min.
Blow Ratio: 0.70

The thickness of the obtained film (not yet drawn) was 20 μm, and showed an elastic recovery of 38% from 50% stretched condition.

Subsequently, the film was subjected as much as 16 times to the combined operation of drawing in the liquid nitrogen and heat-fixing as described in Example 19, to produce a porous polypropylene film.

The average pore diameter and void ratio of the porous polypropylene film measured by the mercury injection process were 0.13 μm and 50.2%, respectively. The water transmission rate was 6.50 l/m²·min·atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

EXAMPLE 21

A polypropylene film (not yet drawn) was prepared in the same machine as in Example 19. The polypropylene employed and the moulding conditions were as follows.

Polypropylene: UBE-PP-Y101J
Resin Discharging Temperature: 210° C.
Collecting Rate: 36 m/min.
Blow Ratio: 0.70

The thickness of the obtained film (not yet drawn) was 10 μm, and showed an elastic recovery of 80% from 50% stretched condition.

The film was drawn in the liquid nitrogen and then heated for heat-fixing in the same manner as in Example 19. After completion of the heat-fixing process, the film was further drawn in an air bath heated to 145° C. to give a length of 180% longer than the length after the initial drawning process using the liquid nitrogen, and the drawn film was again placed under the tension in the air bath heated to 145° C. for 10 minutes, to produce a porous polypropylene film.

The average pore diameter and void ratio of the porous polypropylene film measured by the mercury injection process were 0.12 μm and 51.20%, respectively. The water transmission rate was 15.96 l/m$^2$·min·atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

EXAMPLE 22

A polypropylene film (not yet drawn) was prepared in the same machine as in Example 19. The polypropylene employed and the moulding conditions were as follows.
Polypropylene: UBE-PP-Y101J
Resin Discharging Temperature: 230° C.
Collecting Rate: 20 m/min.
Blow Ratio: 0.70

The thickness of the obtained film (not yet drawn) was 20 μm, and showed an elastic recovery of 38% from 50% stretched condition.

Subsequently, the film was drawn at low temperature, heated for fixing, drawn at elevated temperature, and heated again for fixing in the same manner as in Example 21 except that the liquid nitrogen was replaced with a liquid argon at −180° C., to produce a porous polypropylene film.

The average pore diameter and void ratio of the porous polypropylene film measured by the mercury injection process were 0.13 μm and 53.2%, respectively. The water transmission rate was 6.05 l/m$^2$·min·atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

COMPARISON EXAMPLE 5

A polypropylene film (not yet drawn) was prepared in the same machine as in Example 19. The polypropylene employed and the moulding conditions were as follows.
Polypropylene: UBE-PP-Y101J
Resin Discharging Temperature: 210° C.
Collecting Rate: 36 m/min.
Blow Ratio: 0.70

The thickness of the obtained film (not yet drawn) was 10 μm, and showed an elastic recovery of 80% from 50% stretched condition.

Subsequently, the film was drawn in a helium gas at −195° C. in place of using the liquid nitrogen. In this procedure, the film was immediately broken, and no drawing was accomplished.

COMPARISON EXAMPLE 6

A polypropylene film (not yet drawn) was prepared in the same machine as in Example 19. The polypropylene employed and the moulding conditions were as follows.
Polypropylene: UBE-PP-Y101J
Resin Discharging Temperature: 210° C.
Collecting Rate: 36 m/min.
Blow Ratio: 0.70

The thickness of the obtained film (not yet drawn) was 10 μm, and showed an elastic recovery of 80% from 50% stretched condition.

Subsequently, the film was drawn in an air cooled to −60° C. in place of using the liquid nitrogen. In this procedure, the film was immediately broken, and no drawing was accomplished.

EXAMPLE 23

A polypropylene film (not yet drawn) was prepared in the same machine as in Example 19. The polypropylene employed and the moulding conditions were as follows.
Polypropylene: UBE-PP-Y101J
Resin Discharging Temperature: 230° C.
Collecting Rate: 20 m/min.
Blow Ratio: 0.70

The thickness of the obtained film (not yet drawn) was 11 μm because the resin discharging amount was changed, and showed an elastic recovery of 32% from 50% stretched condition.

Subsequently, the film was drawn in the liquid nitrogen, heated for fixing, drawn at elevated temperature, and heated again for fixing in the same manner as in Example 21, to produce a porous polypropylene film.

The average pore diameter and void ratio of the porous polypropylene film measured by the mercury injection process were 0.59 μm and 19.40%, respectively. The water transmission rate was 5.67 l/m$^2$·min·atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

COMPARISON EXAMPLE 7

A polypropylene film (not yet drawn) was prepared in the same machine as in Example 19. The polypropylene employed and the moulding conditions were as follows.
Polypropylene: UBE-PP-Y101J
Resin Discharging Temperature: 230° C.
Collecting Rate: 20 m/min.
Blow Ratio: 0.70

The thickness of the obtained film (not yet drawn) was 11 μm because the resin discharging amount was changed, and showed an elastic recovery of 32% from 50% stretched condition.

Subsequently, the film was drawn at room temperature (25° C.), and then heated for fixing, drawn at elevated temperature, and heated again for fixing in the same manner as in Example 21, to produce a porous polypropylene film.

The average pore diameter and void ratio of the porous polypropylene film were not able to be measured by the mercury injection process. The water transmission rate was 0.02 l/m².min.atom.

The surface of the obtained polypropylene film was observed by the scanning electron microscope, and no pores were found on the surface. Further it was confirmed upon observation of the section of the film that no pores were formed in the film.

EXAMPLE 24

A polypropylene film (not yet drawn) was prepared in the same machine as in Example 19. The polypropylene employed and the moulding conditions were as follows.

Polypropylene: UBE-PP-Y101J
Resin Discharging Temperature: 210° C.
Collecting Rate: 36 m/min.
Blow Ratio: 0.70

The thickness of the obtained film (not yet drawn) was 10 μm, and showed an elastic recovery of 80% from 50% stretched condition.

The film was then heated under no tension at 145° C. for 10 minutes, and the elastic recovery of the resulting film was enhanced to 87%.

Subsequently, the resulting film was drawn in the liquid nitrogen, heated for fixing, drawn at elevated temperature, and heated again for fixing in the same manner as in Example 21, to produce a porous polypropylene film.

The average pore diameter and void ratio of the porous polypropylene film measured by the mercury injection process were 0.14 μm and 54.60%, respectively. The water transmission rate was 23.18 l/m².min.atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

COMPARISON EXAMPLE 8

A polypropylene film (not yet drawn) was prepared in the same machine as in Example 19. The polypropylene employed and the moulding conditions were as follows.

Polypropylene: UBE-PP-Y101J
Resin Discharging Temperature: 210° C.
Collecting Rate: 36 m/min.
Blow Ratio: 0.70

The thickness of the obtained film (not yet drawn) was 10 μm, and showed an elastic recovery of 80% from 50% stretched condition.

The film was then heated under no tension at 145° C. for 10 minutes, and the elastic recovery of the resulting film was enhanced to 87%.

Subsequently, the film was drawn at room temperature (25° C.), and then heated for fixing, drawn at elevated temperature, and heated again for fixing in the same manner as in Example 21, to produce a porous polypropylene film.

The average pore diameter and void ratio of the porous polypropylene film measured by the mercury injection process was 0.07 μm and 41.50%, respectively. The water transmission rate was 6.66 l/m².min.atom.

While the polypropylene film (not yet drawn) employed in this example was the same as that employed in Example 6, the porous film obtained in this example showed lower value in all of the average pore diameter, void ratio, and water transmission ratio than the porous film obtained in Example 6. The surface of the above porous polypropylene film was observed by the scanning electron microscope, and it was found that on the film surface not a small number of pores were formed. However, it was confirmed upon observation of the section of the film that the number of pores continuously formed from one film surface to another film surface was smaller than that in the film obtained in Example 6.

EXAMPLE 25

A polypropylene film (not yet drawn) was prepared in the same machine as in Example 19. The polypropylene employed and the moulding conditions were as follows.

Polypropylene: UBE-PP-Y101J
Resin Discharging Temperature: 210° C.
Collecting Rate: 36 m/min.
Blow Ratio: 0.70

The thickness of the obtained film (not yet drawn) was 10 μm, and showed an elastic recovery of 80% from 50% stretched condition.

Subsequently, the resulting film was drawn in the liquid nitrogen, and heated for fixing in the same manner as in Example 21 except that the draw ratio in the drawing in the liquid nitrogen was changed to 20%.

Thus treated film was drawn in an air bath heated to 145° C. at a draw ratio of 160% based on the length after the drawing in the liquid nitrogen, and fixed for 10 min. in an air bath heated to 145° C., so as to produce a porous polypropylene film.

The average pore diameter and void ratio of the porous polypropylene film measured by the mercury injection process were 0.14 μm and 56.00%, respectively. The water transmission rate was 17.30 l/m².min.atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

EXAMPLE 26

A polypropylene film (not yet drawn) was prepared in the same machine as in Example 19. The polypropylene employed and the moulding conditions were as follows.

Polypropylene: UBE-PP-Y130G, trade name, available from Ube Industries, Ltd., MFI=30 g/10 min.
Resin Discharging Temperature: 170° C.
Collecting Rate: 36 m/min.
Blow Ratio: 0.70

The thickness of the obtained film (not yet drawn) was 20 μm, and showed an elastic recovery of 30% from 50% stretched condition.

The film was then heated under no tension at 145° C. for 10 minutes, and the elastic recovery of the resulting film was enhanced to 72%.

Subsequently, the resulting film was drawn in the liquid nitrogen, and heated for fixing in the same manner as in Example 21.

Thus treated film was drawn in an air bath heated to 145° C. at a draw ratio of 330% based on the length after the drawing in the liquid nitrogen, and fixed for 10 min. in an air bath heated to 145° C., so as to produce a porous polypropylene film.

The average pore diameter and void ratio of the porous polypropylene film measured by the mercury injection process were 0.98 μm and 65.30%, respectively. The water transmission rate was 59.00 l/m$^2$·min·atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

EXAMPLE 27

A polypropylene film (not yet drawn) was prepared in the same machine as in Example 19. The polypropylene employed and the moulding conditions were as follows.

Polypropylene: UBE-PP-Y130G
Resin Discharging Temperature: 170° C.
Collecting Rate: 36 m/min.
Blow Ratio: 0.70

The thickness of the obtained film (not yet drawn) was 20 μm, and showed an elastic recovery of 30% from 50% stretched condition.

The film was then heated under no tension at 145° C. for 10 minutes, and the elastic recovery of the resulting film was enhanced to 72%.

Subsequently, the film was drawn in the liquid nitrogen, heated for fixing, drawn at elevated temperature, and heated again for fixing in the same manner as in Example 21, to produce a porous polypropylene film.

The average pore diameter and void ratio of the porous polypropylene film measured by the mercury injection process were 0.75 μm and 59.60%, respectively. The water transmission rate was 22.00 l/m$^2$·min·atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

EXAMPLE 28

A polypropylene film (not yet drawn) was prepared in the same machine as in Example 19. The polypropylene employed and the moulding conditions were as follows.

Polypropylene: UBE-PP-Y130G
Resin Discharging Temperature: 170° C.
Collecting Rate: 36 m/min.
Blow Ratio: 0.70

The thickness of the obtained film (not yet drawn) was 20 μm, and showed an elastic recovery of 30% from 50% stretched condition.

The film was then heated under no tension at 145° C. for 10 minutes, and the elastic recovery of the resulting film was enhanced to 72%.

Subsequently, the film was drawn in the liquid nitrogen, heated for fixing, drawn at elevated temperature, and heated again for fixing in the same manner as in Example 21 except that the draw ratio in the drawing in the liquid nitrogen was changed to 20% and said drawing was done only once, to produce a porous polypropylene film.

The average pore diameter and void ratio of the porous polypropylene film measured by the mercury injection process were 0.70 μm and 57.20%, respectively. The water transmission rate was 21.00 l/m$^2$·min·atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

EXAMPLE 29

A polypropylene film (not yet drawn) was prepared in the same machine as in Example 19. The polypropylene employed and the moulding conditions were as follows.

Polypropylene: UBE-PP-Y109K, trade name, available from Ube Industries, Ltd., MFI=9 g/10 min.
Resin Discharging Temperature: 200° C.
Collecting Rate: 36 m/min.
Blow Ratio: 0.70

The thickness of the obtained film (not yet drawn) was 20 μm, and showed an elastic recovery of 41% from 50% stretched condition.

The film was then heated under no tension at 145° C. for 10 minutes, and the elastic recovery of the resulting film was enhanced to 73%.

Subsequently, the resulting film was drawn in the liquid nitrogen, and heated for fixing in the same manner as in Example 21.

Subsequently, the film was drawn in the liquid nitrogen, heated for fixing, drawn at elevated temperature, and heated again for fixing in the same manner as in Example 21, to produce a porous polypropylene film.

The average pore diameter and void ratio of the porous polypropylene film measured by the mercury injection process were 0.53 μm and 60.80%, respectively. The water transmission rate was 22.50 l/m$^2$·min·atom.

The surface of the above porous polypropylene film was observed by the scanning electron microscope, and it was found that throughout the film surface a large number of pores of approximately constant diameter were uniformly formed. Further it was confirmed upon observation of the section of the film that almost all of the pores were continuously formed from one film surface to another film surface.

We claim:

1. A process of producing a porous polypropylene hollow yarn which comprises a step for forming a large number of micropores in the surrounding wall of said yarn by drawing a polypropylene hollow yarn, which is characterized in that the drawing process is performed in a medium selected from the group consisting of nitrogen, oxygen, argon, carbon monoxide and a hydrocarbon at a temperature in the range of the freezing point to 50° C. above the boiling point of said medium.

2. The process as claimed in claim 1, wherein said polypropylene hollow yarn is heat-treated at a temperature in the range of 100° C. to 155° C. prior to being subjected to said drawing process.

3. The process as claimed in claim 1, wherein said polypropylene hollow yarn is heat-treated at a temperature in the range of 110° C. to 155° C. after having been subjected to said drawing process.

4. The process as claimed in claim 1, wherein a draft ratio of a polypropylene hollow yarn prior to being subjected to the drawing is in the range of 10 to 6000.

5. The process as claimed in claim 1, in which the drawing process performed at the low temperature is repeated at least twice.

6. The process as claimed in claim 1, in which said drawing process is performed at a temperature of not higher than −100° C.

7. The process as claimed in claim 1, wherein said polypropylene hollow yarn is drawn at a temperature in the range of 80° C. to 160° C. after having been subjected to the drawing process in said medium at a temperature in the range of the freezing point to 50° C. above the boiling point of said medium.

8. The process as claimed in claim 7, wherein said drawing process performed after the drawing in the medium at the low temperature is drawn at a temperature in the range of 110° to 155° C.

9. The process as claimed in claim 7, wherein said polypropylene hollow yarn is heat-treated at a temperature in the range of 100° C. to 155° C. prior to being subjected to the first drawing process in said medium at the low temperature.

10. The process as claimed in claim 7, wherein said polypropylene hollow yarn is subjected to a heat-fixing process at a temperature in the range of 110° C. to 155° C. between the drawing processes and after having been subjected to the final drawing process.

11. The process as claimed in claim 7, in which the combination of both drawing processes is repeated at least twice.

12. A process of producing a porous thermoplastic resin film which comprises a step for forming a large number of micropores in said film by drawing a thermoplastic resin film, which is characterized in that the drawing process is performed in a medium selected from the group consisting of nitrogen, oxygen, argon, carbon monoxide, methane and ethane at a temperature in the range of the freezing point to 50° C. above the boiling point of said medium under the condition that the temperature for the drawing is not higher than −70° C.

13. The process as claimed in claim 12, in which said drawing process is performed at a temperature of not higher than −100° C.

14. The process as claimed in claim 12, in which the drawing process performed at the low temperature is repeated at least twice.

15. The process as claimed in claim 14, wherein said thermoplastic resin film is subjected to a heat-fixing process at a temperature of lower than the melting temperature of said thermoplastic resin by the range of 20° C. to 5° C. between the drawing processes and after having been subjected to the final drawing process.

16. The process as claimed in claim 12, wherein said thermoplastic resin is polypropylene.

17. The process as claimed in claim 12, wherein said thermoplastic resin film is drawn at a temperature of lower than the melting temperature of said thermoplastic resin by the range of 90° C. to 5° C. after having been subjected to the drawing process in said medium at the low temperature.

18. The process as claimed in claim 17, in which the combination of both drawing processes is repeated at least twice.

19. The process as claimed in claim 17, wherein said thermoplastic resin film is subjected to a heat-fixing process at a temperature of lower than the melting temperature of said thermoplastic resin by the range of 20° C. to 5° C. between the drawing processes and after having been subjected to the final drawing process.

* * * * *